(12) United States Patent
Witsch et al.

US008778046B2

(10) Patent No.: US 8,778,046 B2
(45) Date of Patent: Jul. 15, 2014

(54) FLUTABLE FIBER WEBS WITH HIGH DUST HOLDING CAPACITY

(71) Applicant: Hollingsworth & Vose Company, East Walpole, MA (US)

(72) Inventors: James M. Witsch, Saratoga Springs, NY (US); Douglas M. Guimond, Pepperell, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 13/969,228

(22) Filed: Aug. 16, 2013

(65) Prior Publication Data
US 2013/0333341 A1   Dec. 19, 2013

Related U.S. Application Data

(60) Continuation of application No. 13/339,999, filed on Dec. 29, 2011, now Pat. No. 8,545,590, which is a division of application No. 12/488,348, filed on Jun. 19, 2009, now Pat. No. 8,236,082.

(51) Int. Cl.
  *B01D 39/14* (2006.01)
  *B01D 39/16* (2006.01)

(52) U.S. Cl.
  USPC .................................. 55/527; 55/524; 55/528

(58) Field of Classification Search
  USPC ..................................... 55/521, 522, 527, 528
  See application file for complete search history.

(56) References Cited

U.S. PATENT DOCUMENTS

| | | | |
|---|---|---|---|
| 4,197,812 A | 4/1980 | Clayton | |
| 4,233,346 A | 11/1980 | Kerkhofs | |
| 4,455,195 A | 6/1984 | Kinsley | |
| 5,281,307 A | 1/1994 | Smigo et al. | |
| 5,397,632 A | 3/1995 | Murphy et al. | |
| 5,505,995 A | 4/1996 | Leonard | |
| 5,580,459 A | 12/1996 | Powers et al. | |
| 5,586,997 A * | 12/1996 | Pall et al. | 55/361 |
| 5,599,366 A * | 2/1997 | Hassenboehler et al. | 55/486 |
| 5,611,887 A | 3/1997 | Takenaka et al. | |
| 5,672,399 A | 9/1997 | Kahlbaugh et al. | |
| 5,785,725 A | 7/1998 | Cusick et al. | |
| 6,099,913 A | 8/2000 | Clarke et al. | |
| 6,171,684 B1 | 1/2001 | Kahlbaugh et al. | |
| 6,190,735 B1 | 2/2001 | Radwanski et al. | |
| 6,419,839 B1 | 7/2002 | Cox et al. | |
| 6,454,839 B1 | 9/2002 | Hagglund et al. | |
| 6,513,184 B1 | 2/2003 | Brown et al. | |
| 6,521,321 B2 | 2/2003 | Kahlbaugh et al. | |
| 6,579,350 B2 | 6/2003 | Doherty | |
| 6,673,136 B2 | 1/2004 | Gillingham et al. | |
| 6,723,670 B2 | 4/2004 | Kajander et al. | |
| 6,746,517 B2 | 6/2004 | Benson et al. | |
| 6,800,117 B2 | 10/2004 | Barris et al. | |
| 6,974,490 B2 | 12/2005 | Gillingham et al. | |
| 6,994,742 B2 | 2/2006 | Barris et al. | |
| 7,008,465 B2 | 3/2006 | Graham et al. | |
| 7,090,712 B2 | 8/2006 | Gillingham et al. | |
| 7,137,510 B1 | 11/2006 | Klein et al. | |
| 7,150,774 B2 | 12/2006 | Kubokawa et al. | |
| 7,166,190 B2 | 1/2007 | Graef et al. | |
| 7,169,202 B2 | 1/2007 | Kubokawa | |
| 7,270,692 B2 | 9/2007 | Gillingham et al. | |
| 7,303,604 B2 | 12/2007 | Gieseke et al. | |
| 7,314,497 B2 | 1/2008 | Kahlbaugh et al. | |
| 7,488,365 B2 | 2/2009 | Golden et al. | |
| 7,582,132 B2 | 9/2009 | Jaffee | |
| 7,608,125 B2 | 10/2009 | Jaffee | |
| 7,648,542 B1 | 1/2010 | Hunter et al. | |
| 8,236,082 B2 | 8/2012 | Witsch et al. | |
| 8,357,220 B2 | 1/2013 | Guimond et al. | |
| 8,545,590 B2 | 10/2013 | Witsch et al. | |
| 2004/0255783 A1 | 12/2004 | Graham et al. | |
| 2005/0060972 A1 | 3/2005 | Gieseke et al. | |
| 2005/0079379 A1 | 4/2005 | Wadsworth et al. | |
| 2005/0097695 A1 | 5/2005 | Tanaka et al. | |
| 2005/0252182 A1 | 11/2005 | Golden et al. | |
| 2006/0096932 A1 | 5/2006 | Dema et al. | |
| 2006/0272303 A1 | 12/2006 | Fujiwara et al. | |
| 2007/0028767 A1 | 2/2007 | Choi et al. | |
| 2007/0056256 A1 | 3/2007 | Tepper et al. | |
| 2007/0060003 A1 | 3/2007 | Ellis et al. | |

(Continued)

FOREIGN PATENT DOCUMENTS

| CN | 2469973 Y | 1/2002 |
|---|---|---|
| CN | 1615172 A | 5/2005 |

(Continued)

OTHER PUBLICATIONS

International Search Report and Written Opinion for Application No. PCT/US2010/001653 mailed Aug. 10, 2010.
International Preliminary Report on Patentability for PCT/US2010/001653 mailed Dec. 22, 2011.
International Search Report and Written Opinion for Application No. PCT/US2010/0038972 mailed Aug. 13, 2010.
International Preliminary Report on Patentability for PCT/US2010/038972 mailed Jan. 5, 2012.
International Search Report for PCT/US2009/063581 mailed Jan. 27, 2010.
[No Author Listed] Pall Ultipor® SRT Filter Elements: The next generation in anti-static, stress-resistant media. Product Data Sheet. 2007. 2 pages.

(Continued)

*Primary Examiner* — Robert Clemente
(74) *Attorney, Agent, or Firm* — Wolf, Greenfield & Sacks, P.C.

(57) ABSTRACT

The fiber webs described herein may be incorporated into filter media and filter elements. The fiber webs may exhibit a high dust holding capacity. The fiber webs may also exhibit a low thickness. The fiber webs may be sufficiently flexible and/or deformable so that they may be processed to include a series of waves (also known as flutes) that extend along the cross-machine direction.

23 Claims, 4 Drawing Sheets

(56) References Cited

U.S. PATENT DOCUMENTS

| | | |
|---|---|---|
| 2007/0137157 A1 | 6/2007 | Linhart et al. |
| 2007/0271886 A1 | 11/2007 | Rieger et al. |
| 2007/0271889 A1 | 11/2007 | Jaffee |
| 2007/0271890 A1 | 11/2007 | Jaffee |
| 2008/0010959 A1 | 1/2008 | Gillingham et al. |
| 2008/0202078 A1 | 8/2008 | Healey et al. |
| 2008/0230464 A1 | 9/2008 | Winstrup et al. |
| 2008/0282890 A1 | 11/2008 | Rocklitz et al. |
| 2009/0077938 A1 | 3/2009 | Kume et al. |
| 2009/0120048 A1 | 5/2009 | Wertz et al. |
| 2009/0249951 A1 | 10/2009 | Graber et al. |
| 2010/0000411 A1 | 1/2010 | Wertz et al. |
| 2010/0116138 A1 | 5/2010 | Guimond et al. |
| 2010/0155006 A1 | 6/2010 | Ales et al. |
| 2010/0252510 A1 | 10/2010 | Godsay et al. |
| 2010/0314333 A1 | 12/2010 | Witsch et al. |
| 2010/0319543 A1 | 12/2010 | Witsch et al. |
| 2011/0079553 A1 | 4/2011 | Thomson et al. |
| 2011/0147976 A1 | 6/2011 | Wertz et al. |
| 2013/0333852 A1 | 12/2013 | Witsch et al. |

FOREIGN PATENT DOCUMENTS

| | | |
|---|---|---|
| CN | 101232931 A | 7/2008 |
| WO | WO 87/01301 | 3/1987 |
| WO | WO 01/37970 A1 | 5/2001 |
| WO | WO 03/047722 A2 | 6/2003 |
| WO | WO 2007/019294 A2 | 2/2007 |
| WO | WO 2009/012189 | 1/2009 |
| WO | WO 2009/067365 | 5/2009 |
| WO | WO 2010/054218 A1 | 5/2010 |

OTHER PUBLICATIONS

[No Author Listed] Hollingsworth & Vose Product Table. Hollingsworth & Vose. Table. 1 page.

Wypych et al., Chapter 8: The effect of fillers on the mechanical properties of filled materials. Handbook of Fillers, $2^{nd}$ ed. 2000. 395-402.

* cited by examiner

FLUTABLE FIBER WEBS WITH HIGH DUST HOLDING CAPACITY

RELATED APPLICATIONS

This application is a continuation of U.S. application Ser. No. 13/339,999, filed Dec. 29, 2011, which is a divisional of U.S. application Ser. No. 12/488,348, filed Jun. 19, 2009, both of which are incorporated herein by reference in their entireties.

FIELD OF INVENTION

The present invention relates generally to filtration and, more particularly, to flutable fiber webs that have a high dust holding capacity and can be used in filter elements.

BACKGROUND OF INVENTION

Filter elements can be used to remove contamination in a variety of applications. Such elements can include a web of fibers. The fiber web provides a porous structure that permits fluid (e.g., gas, liquid) to flow through the element. Contaminant particles contained within the fluid may be trapped on the fiber web. Depending on the application, the fiber web may be designed to have different performance characteristics.

Fiber webs can be manufactured using conventional equipment. During manufacturing, fibers may be laid down in a continuous process to produce the web. This can lead to fiber alignment and the fiber web having a "machine direction" which is defined by the direction in which the web moves along the processing equipment, and a "cross-machine direction" which is perpendicular to the machine direction. Because of the fiber alignment, amongst other effects, properties of the fiber web along the machine direction can differ from properties along the cross-machine direction.

It may be advantageous to increase the effective surface area of the fiber web in some applications. For example, the fiber web may be waved to increase surface area. Such waves are generally referred to as corrugation, if they extend in the machine direction of the fiber web. The waves are called "flutes" if they extend in the cross-machine direction. The waved fiber webs can be combined with a backing layer to form channels through which fluid may flow. Some filter element configurations can take advantage of the channels and increased surface area provided by using fluted webs or by using corrugated webs. The machine direction and cross-machine direction properties of the web can play a role in its suitability for use in a particular configuration.

For various applications, it may be beneficial to have filter media with increased dust holding capacity. In addition, for some applications, filter media may be manufactured to have low thickness. However, in manufacturing filter media, when maintaining pore size and efficiency, a trade off may exist between having a high dust capacity and a low thickness of the filter media.

SUMMARY OF INVENTION

Flutable fiber webs that have a high dust holding capacity are described herein.

In one aspect, a fiber web is provided. The fiber web has a machine direction and a cross-machine direction. The fiber web includes a series of flutes that extend in the cross-machine direction. The fiber web has a dust holding capacity of greater than about 3 mg/cm$^2$ and a thickness of less than about 30 mils.

In one aspect, a fiber web is provided. The fiber web has a machine direction tensile elongation of greater than about 2%, a cross-machine direction tensile elongation of greater than about 2%, a dust holding capacity of greater than about 3 mg/cm$^2$, and a thickness of less than about 30 mils.

In one aspect, a method of manufacturing a fiber web is provided. The method includes forming a fiber mixture; forming a resin formulation; non-compressively adding the resin formulation to the fiber mixture prior to drying the fiber mixture; and drying the fiber mixture with the resin formulation to form a fiber web. The fiber web is capable of being fluted by including a series of flutes that extend in a cross-machine direction. The fiber web has a dust holding capacity of greater than about 3 mg/cm$^2$, and the fiber web has a thickness of less than about 30 mils.

In one aspect, a method of filtering a fluid is provided. The method includes filtering a fluid using a filter element comprising a fiber web. The fiber web includes a series of flutes that extend in the cross-machine direction. The fiber web has a dust holding capacity of greater than about 3 mg/cm$^2$ and a thickness of less than about 30 mils.

Other aspects, embodiments, advantages and features of the invention will become apparent from the following detailed description.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
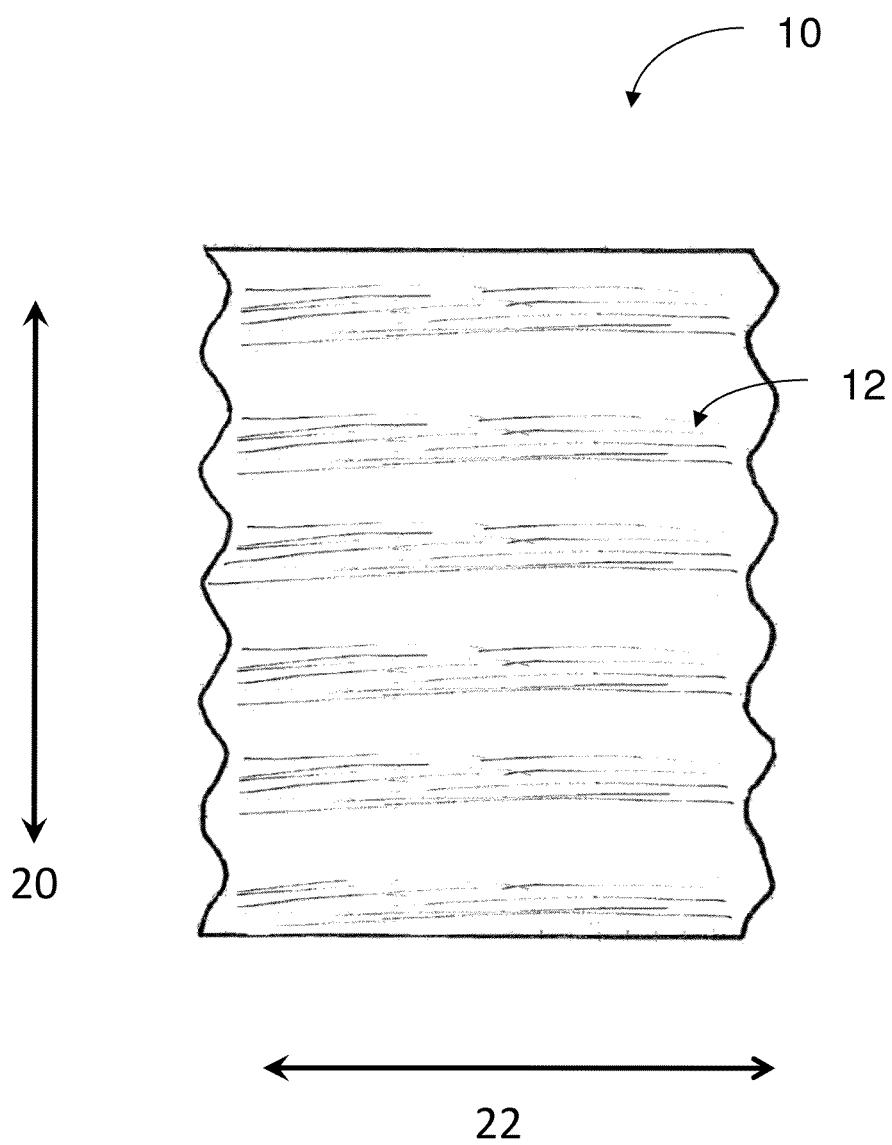
FIG. 1 depicts a fiber web with flutes that extend in the cross-machine direction in accordance with some embodiments.

The fiber webs described herein may be incorporated into filter media and filter elements. The fiber webs may exhibit a high dust holding capacity. In addition, the fiber webs may exhibit a low thickness. The fiber webs may be formed by coating a mixture of wet laid fibers with a resin using a generally non-compressive coating process (e.g., curtain coating). The webs may also be sufficiently flexible and/or deformable so that they may be processed to include a series of waves (also known as flutes) that extend along the cross-machine direction of the webs without visibly cracking or splitting the webs. The flutes increase the effective surface area of the webs which can enhance filter performance. The flutes also provide web surface separation which can form channels within the resulting filter elements, through which fluid may flow. For example, channels may be formed between a fluted fiber web and a backing applied to the web. As described further below, the fiber webs can include various components (e.g., different fiber types, resin) which are selected and combined according to a suitable process to impart the desired high dust holding capacity, low thickness, and mechanical properties. The webs may be incorporated into a variety of types of filter elements which are used in a number of applications including, in particular, those that benefit from an increased dust holding capacity.

The fiber webs may be formed of one or more types of fibers and a resin formulation to provide mechanical and chemical properties. As described further below, a resin formulation may comprise several components including a resin, a crosslinking agent, and other additives. However, in some embodiments, additives may be provided to the fiber web separately from the resin formulation.

In some cases, fiber(s) may be the principal component of the fiber web. That is, in these cases, the total fiber weight percentage may be greater than the weight percentage of any other component in the web. For example, the fiber component(s) may comprise between about 50% and about 95% of the total weight of the fiber web. In some embodiments, the fibers make up between about 55% and about 90% (e.g., between about 60% and about 85%) by weight of the fiber web. The resin formulation may comprise the remainder of the fiber web that is not the fiber component(s) in certain embodiments. In some embodiments, the resin formulation comprises between about 1% and about 50% of the total weight of the fiber web. In some embodiments, the resin formulation includes between about 5% and about 45% (e.g., between about 20% and about 40%) by weight of the fiber web.

It should be understood that in some embodiments the fiber web may include fiber component(s) and/or resin formulations outside the above-noted ranges.

In general, the fiber component(s) of the fiber web may be formed of any suitable composition. Suitable compositions include cellulose, synthetic materials, and glass. As described further below, it may be preferable to use cellulose fibers as a single fiber composition in the fiber web; though, in other cases, a blend of different fiber compositions may be used.

Suitable cellulose fiber compositions include softwood fibers, hardwood fibers and combinations thereof. Examples of softwood cellulose fibers include fibers that are derived from the wood of pine, cedar, alpine fir, douglas fir, and spruce trees. Examples of hardwood cellulose fibers include fibers derived from the wood of eucalyptus (e.g., Grandis), maple, birch, and other deciduous trees.

Suitable synthetic fibers include fibers formed from polyaramid, polypropylene, polyethylene, polyamide, polyether ether ketone, polyester (e.g., PET), lyocell, rayon, and combinations thereof. It should be understood that other types of synthetic fibers may also be used. Various synthetic fiber configurations may also be used. In some embodiments, synthetic fibers may have a single composition; or, in other embodiments, synthetic fibers may have multiple compositions. That is, an individual synthetic fiber may have a single composition in some embodiments; or, in other embodiments, an individual synthetic fiber may have multiple compositions. When the fibers have multiple compositions, the fibers may be referred to as multi-component fibers. An example of a multi-component fiber is a bi-component fiber which includes a first material and a second material. Multi-component fibers may have a variety of spatial arrangements of their components including a core-sheath configuration (e.g., the first material may be a sheath material that surrounds the second material which is a core material), a side by side configuration, a segmented pie arrangement, a tri-lobal arrangement (e.g., the first material may be at the tip of the lobe) and an arrangement of localized regions of one component in the other component (e.g., "islands in sea").

Suitable glass fibers may include chopped strand glass fibers or microglass fibers.

As noted above, the fiber web may include a primary fiber type. In some of these embodiments, the cellulose fibers may be the primary fiber type. In some embodiments, all of the fiber in the web may be cellulose fiber. In some embodiments, the fiber web may include between about 50 and about 95 weight percent cellulose fibers. In some embodiments, the fiber web may include between about 55 and about 90 weight percent (e.g., between 60 and 85 weight percent) cellulose fibers. In some of these embodiments, the cellulose fiber within the web may comprise both softwood and hardwood fibers. For example, the fiber web may include between about 0 and about 95 weight percent (e.g., between 30 and 60 weight percent, or between 35 and 50 weight percent) softwood and between about 0 and about 95 weight percent (e.g., between 20 and 40 weight percent, or between 25 and 35 weight percent) hardwood. It should be understood that some embodiments may include fiber compositions and weight percentages outside the above-noted ranges. In some cases, cellulose fibers may naturally absorb water to a certain percentage (e.g., 3-5% of the fiber weight).

In general, cellulose fibers may have any suitable dimensions. In some embodiments, the average diameter of the cellulose fibers are less than about 50 microns. For example, the average fiber diameter may be between about 5 microns and about 50 microns. The general dimensions of softwood and hardwood cellulose fibers may vary depending on the type of tree that the cellulose fibers are derived from. The diameter of softwood cellulose fibers may generally be less than about 50 microns, between about 10 microns and about 40 microns, or between about 20 microns and about 30 microns. The aspect ratio of softwood cellulose may range between about 10 and about 300, between about 20 and about 200, or between about 30 and about 50. The diameter of hardwood cellulose fibers may generally be less than about 50 microns, between about 5 microns and about 50 microns, or between about 10 microns and about 20 microns. In some embodiments, the aspect ratio of hardwood cellulose may range between about 10 and about 300, between about 20 and about 200, or between about 30 and about 60.

The fiber web may include more than one type of fiber, for example, a blend of cellulose fibers and synthetic fibers. In some cases, the weight percentage of cellulose fiber may be greater than the weight percentage of synthetic fiber. In other cases, the weight percentage of synthetic fiber may be greater than the weight percentage of cellulose fiber. In some embodiments, the principal fiber type may be synthetic fibers, e.g., between about 50% and about 95%, between about 55% and about 90%, between about 60% and about 85% of the total weight of the fiber web may be synthetic fibers. In some embodiments, all of the fiber in the web may be synthetic.

In addition to the fiber component(s), the fiber web includes an appropriate resin formulation. As noted above, the resin formulation can include a number of different components such as a resin, and a crosslinking agent, amongst other additives. In some embodiments, the resin formulation may be between about 1% and about 50%, between about 5% and about 45%, or between about 20% and about 40% of the total weight of the fiber web.

The resin is generally the principal component of the resin formulation. That is, the resin is generally the largest component by weight of the resin formulation. In some cases, the resin may be between about 1% and about 50%, between about 5% and about 45%, or between about 20% and about 40% weight of the fiber web.

In general, any suitable resin may be used. Examples of suitable resins include polymers such as styrene acrylic, acrylic, polyethylene vinyl chloride, styrene butadiene rubber, polystyrene acrylate, polyacrylates, polyethylene vinyl chloride, polyvinyl chloride, polynitriles, polyvinyl acetate, polyvinyl alcohol derivatives, starch polymers, epoxy, phenolics, and combinations thereof, including both waterborne and solvent versions. It should be understood that other resin compositions may also be suitable. In some embodiments, the resin may exhibit a glass transition temperature less than about 60° C., between about 10° C. and about 55° C., or between about 20° C. and about 40° C. In some cases, the resin may be in a latex form, such as a water-based emulsion.

The resin may exhibit self-crosslinking or non-crosslinking behavior. For example, a self-crosslinking resin may include monomers (e.g., N-methylolacrylamide, or other crosslinking groups) in the backbone that exhibit crosslinking behavior. If the resin material is not self-crosslinking, then an appropriate crosslinking agent may be added to the resin material. The weight percentage of the crosslinking agent based on the total weight of the resin formulation (when dry) can be less than about 20 weight percent, between about 1 and about 10 weight percent, and, in some cases, between about 0.5 and about 2.5 weight percent. The fiber web may include less than about 1 weight percent of the crosslinking agent. Examples of suitable crosslinking agents include melamine formaldehyde, alkylated melamine formaldehyde, N-alkyl melamine, DMDHEU, epoxy, aziridine, and/or combinations thereof.

It should be appreciated that other crosslinking agents and/or weight percentages may also be suitable.

The fiber webs may also include other conventional additives that may be added to impart desirable characteristics. For example, to impart antimicrobial and/or antifungal properties, the webs may include suitable antimicrobial and/or antifungal agents such as silver or silver-based compounds, copper or copper-based compounds, diiodomethyl-p-tolysolfone, methyl peracept, 5-chloro-2-(2,4-dichlorophenoxy) phenol, triclosan, pyrithion derivates, halogenated phenoxy compounds, and zinc 2-pyridinethiol-1-oxide, amongst others. In some embodiments, the fiber web may include a flame retardant agent such as antimony trioxide, decabromodiphenyl ether, halogenated polymers, halogenated compounds, phosphorous-based compounds (e.g., diammonium phosphate), aluminum-based compounds, nitrogen-based compounds, magnesium sulfate, and guanidine, amongst others. In some embodiments, the fiber web may include a conductive material such as graphite, carbon black, metals (e.g., aluminum, iron, copper), conductive polymers and/or resins (e.g., derivatives of polyacetylene, polyaniline, Polypyrrole, Poly(phenylene vinylene), poly(3-alkylthiophenes), amongst others), doped materials (e.g., phosphorus-doped, boron-doped), and conductive salts, amongst others.

As noted above, additives may be present as a separate component from the resin formulation in some embodiments.

The fiber webs may be incorporated into a filter media. The filter media may include a single fiber web or more than one fiber web having different characteristics. The filter media may also include other components in addition to the fiber web(s), such as a backing, a laminated scrim, and/or additional additives as described above.

As noted above, the fiber webs described herein can include a series of flutes. The flutes, for example, may be in the form of a sinusoidal pattern of waves. In certain preferred embodiments, the flutes extend in the cross-machine direction as shown in FIG. 1. As shown, fiber web 10 has a machine direction 20 and a cross-machine direction 22. The fiber web 10 has flutes 12 having peaks and valleys where the flutes run parallel to the cross-machine direction 22. As noted above, the cross-machine direction 22 is perpendicular to the machine direction 20 and the machine direction 20 is defined by the direction in which the fiber web moves along the processing equipment. However, it should be understood that not all embodiments are limited to flutes that extend in the cross-machine direction. When a fiber web is considered to be flutable, the fiber web may undergo a fluting process such that no visible cracking or splitting of the fiber web occurs.

The flutes of the fiber web may be within a range of frequencies and amplitudes. For example, the frequency of flutes may be greater than about 1 flute/inch, between about 1 flute/inch and about 20 flutes/inch, or between about 4 flutes/inch and about 8 flutes/inch. The amplitude of the flutes may range between about 1 mil and about 100 mils, between about 5 mils and about 75 mils, or between about 10 mils and about 45 mils. As used herein, the amplitude is defined as the distance between the top of a peak and bottom of a valley. In general, in a given fiber web, the flutes generally have a similar amplitude and similar frequency across the web, though that is not a requirement. It should also be understood that flute frequencies and amplitudes outside the above-noted ranges are possible.

In some embodiments, it may be preferable for the fiber web to be sufficiently flexible and/or deformable to facilitate formation of the fluted structure described above. The flexibility and deformability can be characterized by a number of mechanical properties including Mullen burst tests and tensile tests.

In general, the Mullen burst tests measure the pressure required for puncturing a fiber web as an indicator of the load carrying capacity of the fiber web under specified conditions. Mullen burst may be measured for the fiber web in both dry and wet conditions. In some embodiments, the dry Mullen burst for the fiber web may be greater than about 15 psi, between 15 psi and about 90 psi, or between about 20 psi and about 60 psi. Additionally, the as is (prior to cure) wet Mullen burst may be between about 5 psi and 80 psi, between about 7 psi and about 50 psi, or between about 10 psi and about 35 psi. The fully cured wet Mullen burst may be between about 10 psi and 100 psi, between about 15 psi and about 70 psi, or between about 20 psi and about 40 psi. The ratio of the as is wet Mullen tests to the fully cured Mullen tests may be between about 0.1 and about 1.0, between about 0.3 and about 0.95, or between about 0.7 and about 0.9. Mullen burst tests are measured following the Technical Association of the Pulp and Paper Industry (TAPPI) Standard T 403 om-91, "Bursting strength of paper."

The fiber web may have different tensile properties in the machine direction as compared to the cross-machine direction. In some embodiments, the tensile elongation values in the machine direction may be less than that in the cross-machine direction, while the tensile strength values in the machine direction may be greater than that in the cross-machine direction. For example, the machine direction tensile elongation of the fiber web may be greater than about 2%, between about 2% and about 8%, or between about 3% and about 5%. The cross-machine direction tensile elongation of the fiber web may be greater than about 2%, between about 2% and about 15%, or between about 4% and about 10%. The machine direction tensile strength of the fiber web may be greater than about 10 lb/in (e.g., between about 10 lb/in and 50 lb/in, or between about 20 lb/in and 30 lb/in). The cross-machine direction tensile strength of the fiber web may be greater than about 3 lb/in (e.g., between about 7 lb/in and about 30 lb/in, or between about 10 lb/in and about 20 lb/in).

In some cases, the cross machine direction tensile strength may be greater or less than the machine direction tensile strength. The ratio between the machine direction tensile strength and cross machine direction tensile strength may range between about 0.5 and about 5, between about 1 and about 4, or between about 1.5 and about 2.5. Tensile tests are measured following TAPPI Standard T 494 om-88, "Tensile breaking properties of paper and paperboard (using constant rate of elongation apparatus)" using a pull rate of 2"/min.

In some embodiments, the machine direction wet Gurley stiffness of the fiber web may be measured to be greater than about 10 mg, between about 10 mg and about 2000 mg, or between about 50 mg and about 500 mg. In some embodiments, the machine direction dry Gurley stiffness of the fiber web may be measured to be greater than about 200 mg, between about 200 mg and about 3000 mg, or between about 400 mg and about 1200 mg. Gurley stiffness tests are measured following TAPPI Standard test 543, "Bending stiffness of paper."

In general, the fiber web may have any suitable basis weight. For example, the basis weight of the fiber web may range from between about 20 g/m$^2$ and about 150 g/m$^2$, between about 60 g/m$^2$ and about 80 g/m$^2$, or between about 30 g/m$^2$ and about 100 g/m$^2$. The basis weight of the fiber web is measured according to TAPPI Standard T 410 om-93.

In general, the fiber web may have any suitable thickness. Suitable thicknesses include, but are not limited to, less than about 30 mils, between about 2 mils and about 25 mils, or between about 5 mils and about 15 mils. The fiber web thickness is determined according to TAPPI T 411 om-89, "Thickness (caliper) of paper, paperboard, and combined board" using an electronic caliper microgauge 3.3 Model 200-A manufactured by Emveco, www.emveco.com, and tested at 1.5 psi.

The fiber web may have a range of permeability. For example, the permeability of the fiber web may range from between about 5 cubic feet per minute per square foot (cfm/sf) and about 200 cfm/sf, between about 5 cfm/sf and about 100 cfm/sf, between about 10 cfm/sf and about 80 cfm/sf, or between about 15 cfm/sf and about 50 cfm/sf. The permeability of the fiber web is measured according to TAPPI Method T251. The permeability of a fiber web is an inverse function of flow resistance and can be measured with a Frazier Permeability Tester. The Frazier Permeability Tester measures the volume of air per unit of time that passes through a unit area of sample at a fixed differential pressure across the sample. Permeability may be expressed in cubic feet per minute per square foot at a 0.5 inch water differential.

In some embodiments, the PMI mean flow pore size of the fiber web may be, for example, greater than about 5 microns, between about 5 microns and about 50 microns, or between about 10 microns and about 20 microns. Mean flow pore size is measured using ASTM Standard F 316, "Pore size characteristics of membrane filters by bubble point."

The fiber web can also be characterized by Palas filtration performance. Such testing is based on the following parameters: test filter area of the fiber web is 100.0 cm$^2$; face velocity is 20.0 cm/sec; dust mass concentration is 200.0 mg/m$^3$; dust/aerosol is SAE fine; total volume flow is about 120.0 L/min, and no discharge. Palas filtration performance is generally measured according to ISO Procedure 5011:2000, "Inlet air cleaning equipment for internal combustion engines and compressors—performance testing."

Palas filtration testing is used to measure the dust holding capacity. The dust holding capacity is the difference in the weight of the fiber web before the exposure to the fine dust and the weight of the fiber web after the exposure to the fine dust when the pressure drop across the fiber web reaches 1,500 Pa, divided by the area of the fiber web. Dust holding capacity may be determined according to the weight (mg) of dust captured per square cm of the media (e.g., through a 100 cm$^2$ test area). In some embodiments, the dust holding capacity may be greater than about 2 mg/cm$^2$, greater than about 3 mg/cm$^2$, greater than about 3.5 mg/cm$^2$, between about 2 mg/cm$^2$ and about 8 mg/cm$^2$, between about 3 mg/cm$^2$ and about 8 mg/cm$^2$, between about 3 mg/cm$^2$ and about 5 mg/cm$^2$, or between about 3.5 mg/cm$^2$ and about 5 mg/cm$^2$.

The initial fractional efficiency may be characterized using Palas filtration tests. In some embodiments, the initial fractional efficiency of the fiber web for particles approximately 0.3 microns in size may be greater than about 50%, between about 50% and about 99%, or between about 60% and about 90%. In some embodiments, the initial fractional efficiency (efficiency at a given particle size) of the fiber web for particles approximately 1.0 micron in size may be greater than about 80%, between about 80% and about 99.99%, or between about 90% and about 99.99%. It can be appreciated that the larger the particle size, the more likely the particles will be captured.

The initial dust retention may also be characterized using Palas filtration tests. In some embodiments, the initial dust retention (efficiency for all particles in the dust) of the fiber web may be greater than about 60%, between about 70% and about 100%, or between about 80% and about 100%.

The initial pressure drop may also be characterized using Palas filtration tests. In some embodiments, the initial pressure drop may be less than 500 Pa, between about 80 Pa and about 300 Pa, between about 99.99 Pa and about 300 Pa, between about 200 Pa and about 300 Pa, between about 80 Pa and about 200 Pa, or between about 80 Pa and about 99.9 Pa.

It should be understood that, in some embodiments, the fiber web may have property values outside one or more of the above-noted ranges.

In general, the fiber web may be processed using conventional techniques and equipment. For example, in some embodiments, a wet laid process may be used to form the fiber web. Suitable techniques can involve forming the resin formulation and a fiber mixture in separate processes, followed by a suitable step (e.g., coating or impregnation) which combines the two. The specific process depends, in part, on the particular components being used. Those of ordinary skill in the art know suitable parameters and equipment for such processing. The following paragraphs include an exemplary description of a process suitable for producing a fiber web that includes cellulose fiber components.

The fiber web formation process can involve mixing softwood and hardwood cellulose fibers together to form a fiber mixture comprising a pulped fiber blend. In some embodiments, the cellulose fibers are added to a pulper with water and stirred until the fibers are suitably dispersed. Additional water is then added to the fiber dispersion for dilution to a desired consistency (e.g., the fiber content is about 0.01% to about 6% of the total fiber/water dispersion). In some embodiments, cellulose fibers may be blended with other fibers (e.g., synthetic fibers such as polyester). For example, other fibers may be added to the dispersion of cellulose fibers followed by additional dilution with water to reach the desired consistency (e.g., the fiber content is about 0.01% to about 6% of the total fiber/water dispersion).

The dispersion of fibers are continually mixed and then subsequently formed into a fiber web using a suitable sheet forming equipment such as a delta former, an inclined wire, a fourdrinier, or a rotoformer.

As noted above, the resin formulation can be prepared in a separate process from the fiber web. For example, the components of the resin formulation including the resin, the crosslinking agent (if present), and additives are mixed in a mixer and diluted with water to an appropriate solids level (e.g., between about 1% and about 50% solids, or between about 5% and about 15% solids). Solids level is defined as the percentage of solids in a liquid media whether in a solution or a dispersion. In general, the mixture should be relatively uniform and continuous. In some cases, as noted above, additives may be added to the fiber web separate from the resin formulation.

Figure 2:
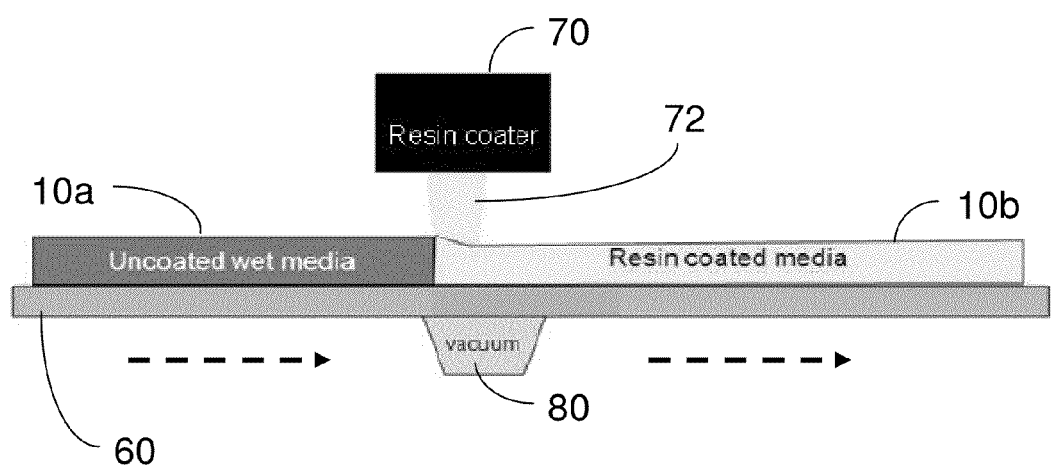
FIG. 2 depicts a coating process for coating a web of fibers with a resin in accordance with some embodiments.

Upon suitable mixing of the fiber component(s), a portion of the resin formulation mixture may be applied to the fiber web using a non-compressive coating technique. The non-compressive coating technique may coat the fiber web, while not substantially decreasing the thickness of the web. In some embodiments, a curtain coater is used for non-compressively coating the fiber web with the resin formulation. FIG. 2 illustrates an embodiment of a curtain coating process. As shown, wet laid fiber component(s) 10a are drawn along a conveyor 60 (in a direction depicted by the dashed arrow) toward a resin coater 70 and a vacuum 80. The resin coater 70 includes the resin formulation 72 which, through gravity, is applied as a stream to the wet laid fibers on the conveyor 60. At the same time, the vacuum 80 pulls the resin formulation 72 toward the conveyor 60 through the wet fiber component(s), forming resin coated fiber component(s) 10b. In some cases, in addition to pulling the resin formulation through the fibers, the vacuum may also exert sufficient pulling pressure to pull the actual fiber component(s) toward the conveyor, decreasing the overall thickness of the fiber component(s). In addition, various coating conditions such as the line speed (e.g., speed at which the conveyor moves relative to the fiber component(s)) and the strength of the vacuum may influence the residual amount of resin content in the fiber web.

It should be understood that the process and configuration shown in FIG. 2 may have a variety of modifications.

It can be understood that other generally non-compressive techniques may be used to apply the resin formulation to the wet laid fiber component(s) in forming the fiber web. For example, techniques that may be used for non-compressively adding resin formulation to the wet laid fiber component(s) include, but are not limited to, gap sized press coating, spray coating, slot application, foam application, and doctor/knife coating, amongst others. For instance, in gap sized press coating, a gap is provided between rotating cylinders of a gravure press so that compression of the fiber web is limited. Foam coating involves a similar process to that shown in FIG. 2 for curtain coating except instead of the stream of resin formulation provided to the fiber component(s) having a specific gravity of generally greater than or equal to 1 g/ml (e.g., for curtain coating), the stream of foam that is provided to the fiber component(s) has a specific gravity of generally less than 1 g/ml. In foam coating, the stream of resin formulation includes entrapped gas.

In some embodiments, a portion of the resin formulation may be added to the fiber component(s) in a wet phase and a portion of the resin formulation may be added to the fiber component(s) after drying. For example, a portion of the resin formulation of the fiber web is applied to the wet laid fiber component(s) prior to drying using a non-compressive coating technique (e.g., curtain coating), the portion being approximately between about 1 and about 99, between about 10 and about 80, or between about 30 and about 60 percent weight of the entire resin formulation of the fiber web. Another portion, or the remainder, of the resin formulation of the fiber web may be applied after drying of the fiber web.

In some embodiments, the entire resin formulation of the fiber web is applied to the wet laid fiber component(s) prior to drying using a generally non-compressive coating technique to form the fiber web.

The fiber web is dried using appropriate methods which may utilize ultrasonic or microwave techniques, steam cans, infrared heaters (gas and/or electric), or air ovens. Typical drying times may be between about 5 seconds and about 10 minutes (e.g., about 5 minutes) and drying temperatures may range between about 100° F. and about 500° F. (e.g., about 300° F.).

As mentioned above, another portion or the remainder of the resin formulation mixture of the fiber web may then be added to the dried fiber web. For example, the resin formulation mixture may be provided as a coating on the fiber web. In some embodiments, a further portion of the resin formulation added to the fiber web may be approximately between about 1 and about 99, between about 20 and about 90, or between about 40 and about 70 percent weight of the entire resin formulation of the fiber web. Examples of suitable coating methods include generally compressive techniques such as gravure coating, and size press coating, amongst others; or generally non-compressive techniques in a manner that minimizes caliper reduction, such as curtain coating, gapped gravure coating, knife coating, and spray coating, amongst others.

The web and resin formulation mixture is then dried and cured at appropriate conditions. For example, drying and curing times of the resin coating with the fiber may be between about 0.1 seconds and about 10 minutes (e.g., about 5 minutes), and temperatures for drying and curing may be between 100° F. and about 500° F. (e.g., about 300° F.). Once the resin and the fiber web are suitably dried and cured, the fiber web may be further processed as desired, for example, to form flutes.

In some embodiments, the fiber component(s) may be coated with a number of resin formulations such that the fiber web has multiple layers of resin coating or multiple resin formulations in a resin coating. In some embodiments, subsequent resin formulations may be applied to the fiber component(s) after a previous resin formulation has been dried. In other embodiments, subsequent resin formulations may be applied to the fiber component(s) during the wet laid process prior to the previous resin formulation being dried. It can be appreciated that multiple combinations of resin formulations may be used in coating the fiber web (e.g., forming a resin coating gradient and/or forming multiple layers of resin coating) to provide for desired properties of the fiber web.

The flutes may be formed in the fiber web by passing the fiber web through male/female corrugation rolls with defined fluting patterns. In some embodiments, flutes may be formed through deformation and shape setting through cooling and crosslinking of the fiber web. In some cases, the fluted fiber web may be laminated to another flat media for holding the flutes in place. In some instances, fluting is performed in situ while the resin has not yet fully cured, allowing for flutes to form through the curing process. In some embodiments, fluting occurs as a secondary process after the sheet is constructed and cured. In some embodiments, the fiber web may be heated during fluting. For example, temperatures during fluting of the fiber web may range between about 70° F. and about 500° F.

Application of the resin formulation to the wet laid fiber component(s) using a non-compressive coating technique may provide for a number of characteristics in the fiber web that give rise to increased dust holding capacity. In some instances, non-compressively incorporating the resin with the fibers during the wet phase provides for enhanced strength of the overall fibrous structure such that the fibrous structure is less prone to collapse throughout the manufacturing process. For example, potential collapse of the fibrous structure may occur from applying resin through a compressive gravure/size press. In lessening the chance for collapse, the fibrous structure may be strengthened through being partially cured from non-compressive application of the resin in the wet phase and subsequent drying of the fibers. When the strength of the fibrous structure is sufficient to avoid collapse, pore size and/or porosity of the fiber web may be maintained so as to generally provide enhanced dust holding capacity. As a result, the fiber web may be manufactured to have both a low thickness a high dust holding capacity. In having a high dust holding capacity and a low thickness, the fiber webs may be used for a variety of applications while generally providing for longer work life of the filter media.

The fiber webs described herein may be incorporated into a number of suitable filter media and filter elements. It should be understood that the filter media and filter elements may have a variety of different constructions with the particular construction depending on the application in which the filter media and elements are used. For example, a backing may be applied to a fluted fiber web to form a filter media that includes a series of channels between the backing and the web. In some instances, a low thickness fluted fiber web allows for incorporation of an increased frequency of channels for a given volume. In some cases, more channels provides for increased fluid flow through the channels of the fiber web. The assembly may be wrapped to form a spiral arrangement as described further below. In some embodiments, the channels may be alternately sealed. This configuration allows fluid (e.g., air) to enter through an open channel with the seal(s) directing the fluid through the web and into an adjacent channel through which it travels and exits the media. In this respect, fluid including contaminants travels in and is filtered through the web. The channels may be layered, providing the filter element with a tight, rugged structure. In some embodiments, the filter media may be spirally and/or radially wound around a central axis.

Figure 3:
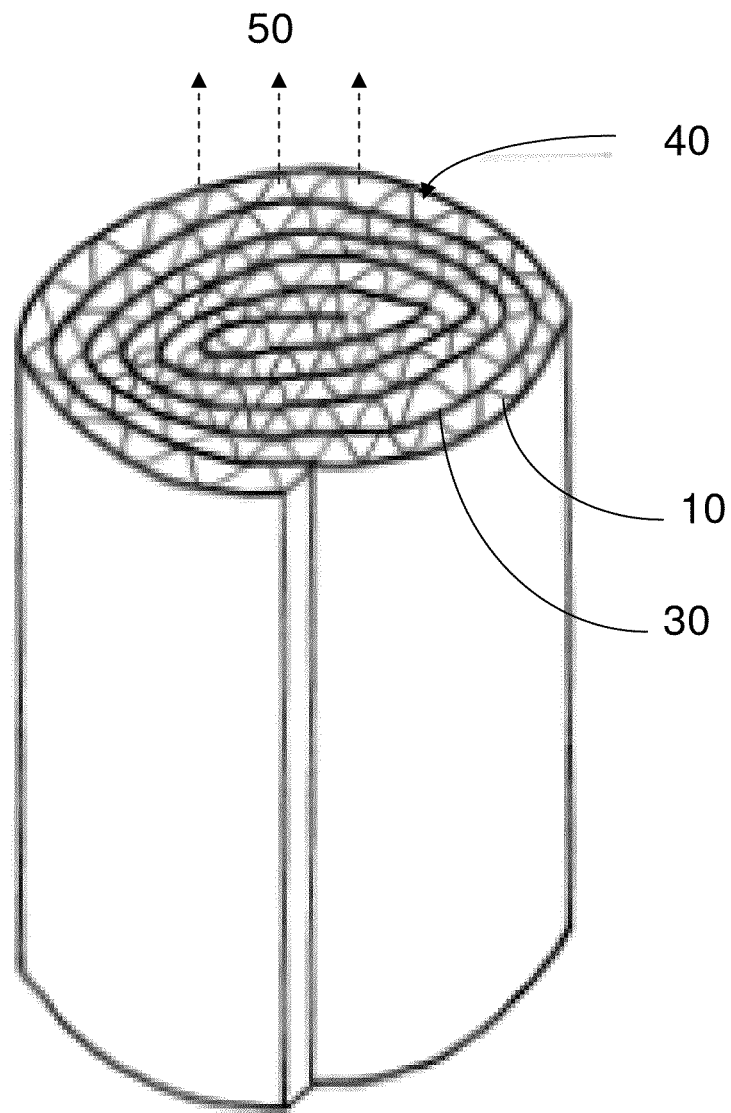
FIG. 3 depicts a fluted fiber web that is laminated to a backing and wrapped into a spiral in accordance with some embodiments.

FIG. 3 illustrates an embodiment of a filter media that includes a fluted fiber web 10 that is laminated to a generally flat backing 30 to form channels 40. The media is in a spiral arrangement. In this embodiment, the machine direction of the web is in the direction in which the web is wound to form the spiral. As shown, fluid is able to readily flow through the channels. As noted above, alternate channels may include seal(s) which direct the fluid into adjacent channels, thus, filtering the fluid. The fluid may exit the channels in a direction depicted by the dotted lines 50. In some embodiments, the arrangement depicted in FIG. 3 may be incorporated into a filter element by addition of a housing.

Fiber webs described herein may be formed as multiphase media where multiple fiber webs having different (or the same) fiber component(s) may be layered on top of one another. In some embodiments, multiphase filter media may be formed by placing one fiber dispersion on to another fiber dispersion during the wet laid process and subsequently removing the water from both fiber dispersions. In some cases, a multiphase filter media (e.g., dual phase) may be tailored to exhibit a suitable gradient in fiber density. Accordingly, dust holding capacity of the filter media may be increased based on appropriate layering of the fiber webs.

In addition, fluted fiber webs presented herein may be incorporated into filter elements for panel, radial, and conical fluid applications. In some cases, the filter element includes a housing that may be disposed around the filter media. The housing can have various configurations, with the configurations varying based on the intended application. In some embodiments, the housing may be formed of a frame that is disposed around the perimeter of the filter media. For example, the frame may be thermally sealed around the perimeter. In some cases, the frame has a generally rounded or oval configuration surrounding the element. The frame may be formed from various materials, including for example, cardboard, metal, polymers, plastic, or any combination of suitable materials. In some embodiments, the filter element includes an inner core around which the filter media comprising the fiber web is wrapped. Filter media that is radially disposed around an inner core, for example, in a cylindrical or conical manner, may be suitably supported by a surrounding frame. The filter elements may also include a variety of other features known in the art, such as stabilizing features for stabilizing the filter media relative to the frame, spacers, or any other appropriate feature.

The fiber webs described herein may be incorporated into a number of suitable filter elements for use in various applications which make use of their fluted and/or dust holding capacity characteristics. The fiber webs may be used in applications that take advantage of their toughness and flexibility which result in a resistance to brittle cracking or failure. Applications that typically use fiber webs in a fluted construction include the construction, agriculture, mining, trucking, and automotive industries. Examples of filter elements that the fiber webs may be incorporated into include, but are not limited to, radial air filter elements, conical air elements, dust collector cartridges, turbine oil filters, fuel filters, and lube elements, amongst others.

The following non-limiting examples describe fiber webs suitable for flutable applications with high dust holding capacity that have been made according to aspects discussed herein.

EXAMPLE 1

A flutable fiber web was produced according to techniques described above. The fiber content was 85% weight of the fiber web. Eucalyptus hardwood fibers comprised 34% of the fiber web. Pine and spruce softwood fibers comprised 51% of the fiber web. Of the softwood fibers, 85% by weight were pine and 15% by weight were spruce. The basis weight of the fiber portion of the product was 65 g/m$^2$. The resin content made up approximately 15% by weight of the fiber web and was applied using a non-compressive curtain coater. Vacuum was applied to remove excess resin. Resin and fibers were dried and cured by using steam filled drying cans. The resin content was comprised of polystyrene acrylate latex, polyvinyl acetate latex, with a melamine formaldehyde crosslinker. Polystyrene acrylate latex comprised 8.25% by weight of the fiber web and polyvinyl acetate latex comprised 6.3% by weight of the fiber web. Melamine formaldehyde crosslinker comprised 0.5% by weight of the fiber web. The Palas filtration performance was measured with Palas Model MFP 2000 coupled with RGB—1000 dust feeder under the operational conditions as described above for Palas filtration.

EXAMPLE 2

A flutable fiber web was produced similarly to how the fiber web in Example 1 was produced. In this example, the fiber content was 72% by weight of the fiber web. Eucalyptus hardwood fibers comprised 29% by weight of the fiber web.

Pine and spruce softwood fibers comprised 43% by weight of the fiber web. The resin content made up 28% by weight of the fiber web and was applied using a non-compressive curtain coater. Vacuum was applied to remove excess resin. Resin and fibers were dried and cured by using steam filled drying cans. The resin content was comprised of polystyrene acrylate latex, polyvinyl acetate latex, with a melamine formaldehyde crosslinker. Polystyrene acrylate latex comprised 15.4% by weight of the fiber web and polyvinyl acetate latex comprised 11.8% by weight of the fiber web. Melamine formaldehyde comprised 0.8% by weight of the fiber web. The Palas filtration performance was measured with Palas Model MFP 2000 coupled with RGB—1000 dust feeder under the operational conditions as described above for Palas filtration.

Figure 4:
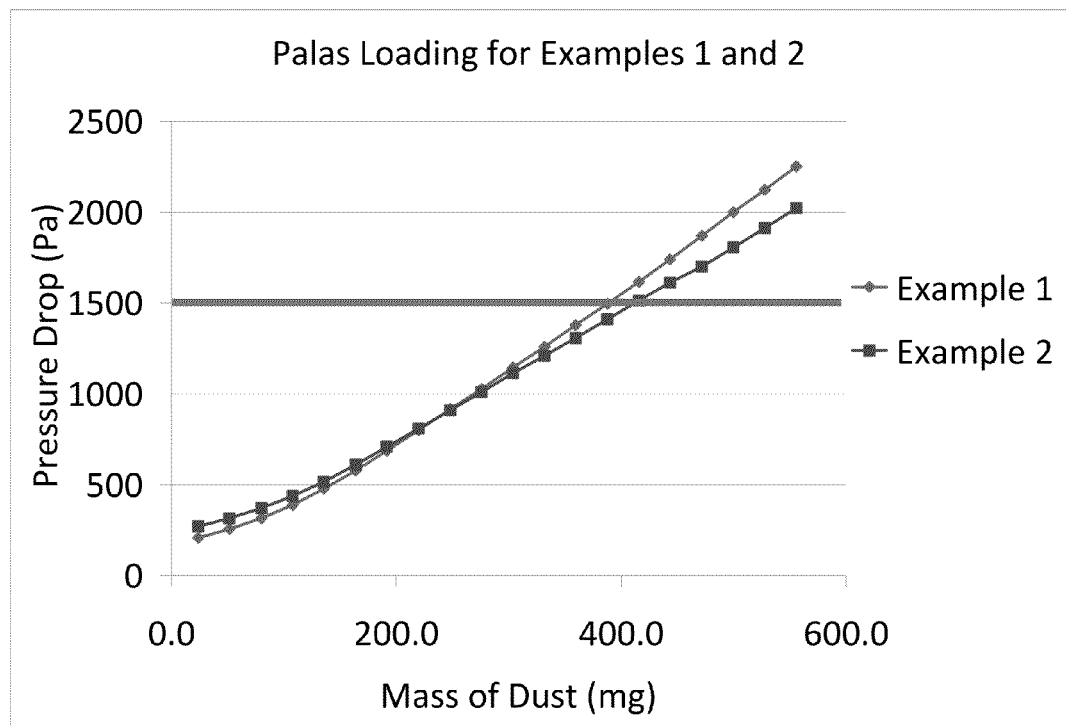
FIG. 4 depicts a graph of Palas filtration performance for two examples of a fiber web showing variations of the mass of dust accumulated and pressure drop in accordance with some embodiments.

FIG. 4 illustrates a graph of the Palas filtration performance for Examples 1 and 2 with the mass of dust accumulated (mg) shown on the x-axis and pressure drop (Pa) shown on the y-axis. At a pressure drop of 1500 Pa, Examples 1 and 2 both exhibit a mass of dust accumulated of about 390 mg. The Palas filtration was measured with an area of 100 cm$^2$, providing for a dust holding capacity of 3.9 mg/cm$^2$.

Table 1 below provides a summary of the characteristics measured for Examples 1 and 2.

|  | Example 1 | Example 2 |
|---|---|---|
| Weight (g/m$^2$) | 76 | 91 |
| Fiber Content (%) | 85 | 72 |
| Hardwood, *Eucalyptus* (% of fiber web) | 34 | 29 |
| Softwood, pine/spruce (% of fiber web) | 51 | 43 |
| Compression during coating | no | no |
| Resin content (%) | 15 | 28 |
| Polystyrene acrylate latex (% of fiber web) | 8.25 | 15.4 |
| Polyvinyl acetate latex (% of fiber web) | 6.3 | 11.8 |
| Melamine formaldehyde (% of fiber web) | 0.5 | 0.8 |
| Thickness (mils) under 1.5 psi load | 14 | 16 |
| Air Permeability (cfm/sf) at 0.5" water | 36 | 25 |
| Mean Flow Pore (microns) | 17 | 19 |
| Dry Mullen (psi) | 27 | 39 |
| Wet Mullen (psi) | 11.4 | 18 |
| Cured Wet Mullen (psi) | 11.5 | 19.3 |
| Wet Mullen Ratio | 1.0 | 0.96 |
| MD Tensile (lb/in) at 2"/min pull rate | 19 | 23 |
| MD Elongation (%) at 2"/min pull rate | 4.7 | 5.2 |
| CD Tensile (lb/in) at 2"/min pull rate | 11 | 15 |
| CD Elongation (%) at 2"/min pull rate | 7.9 | 8.0 |
| Tensile Ratio at 2"/min pull rate | 1.7 | 1.5 |
| MD Dry Gurley Stiffness (mg) | 500 | 860 |
| MD Wet Gurley Stiffness (mg) | 110 | 180 |
| Initial Palas Pressure Drop (Pa) | 180 | 235 |
| Palas Loading at 1500 Pa (mg of Dust) | 390 | 390 |
| Initial Dust Retention (%) | 84 | 88 |
| Palas Efficiency at 0.3 micron | 68 | 76 |
| Palas Efficiency at 1.0 micron | 64 | 97 |

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A fiber web having
   a dust holding capacity of greater than about 3 mg/cm$^2$, wherein the dust holding capacity is measured by Palas filtration performance according to ISO Procedure 5011:2000 when a pressure drop across the fiber web reaches 1,500 Pa with a test face velocity of 20.0 cm/sec and using SAE fine dust at a dust mass concentration of 200.0 mg/m$^3$;
   a basis weight between 30 g/m$^2$ and about 100 g/m$^2$; and
   a machine direction tensile elongation of greater than about 3%.

2. The fiber web of claim 1, wherein the fiber web has a dust holding capacity of between about 3 mg/cm$^2$ and about 8 mg/cm$^2$.

3. The fiber web of claim 1, wherein the fiber web has a thickness of less than 30 mils.

4. The fiber web of claim 1, wherein the fiber web has a thickness of between about 5 mils and about 15 mils.

5. The fiber web of claim 1, wherein the principal fiber type in the fiber web is synthetic fibers.

6. The fiber web of claim 1, wherein the fiber web includes a resin formulation.

7. The fiber web of claim 6, wherein the resin formulation comprises between about 1% and about 50% by weight of the fiber web.

8. The fiber web of claim 6, wherein the resin formulation is cross-linked.

9. The fiber web of claim 1, wherein the fiber web has a tensile elongation in the cross-machine direction of greater than about 2%.

10. The fiber web of claim 1, wherein the fiber web has a tensile elongation in the cross-machine direction is between about 2% and about 15%.

11. The fiber web of claim 1, wherein the fiber web has a basis weight between 60 g/m$^2$ and about 80 g/m$^2$.

12. The fiber web of claim 1, wherein the fiber web has a permeability of between about 5 cfm/sf and about 200 cfm/sf.

13. The fiber web of claim 1, wherein the fiber web has a machine direction tensile elongation of between about 3% and about 8%.

14. The fiber web of claim 1, wherein the fiber web has a machine direction tensile elongation of between about 3% and about 5%.

15. The fiber web of claim 14, wherein the fiber web has a dust holding capacity of between about 3 mg/cm$^2$ and about 8 mg/cm$^2$.

16. The fiber web of claim 14, wherein the fiber web has a thickness of less than 30 mils.

17. The fiber web of claim 14, wherein the fiber web has a thickness of between about 5 mils and about 15 mils.

18. The fiber web of claim 14, wherein the principal fiber type in the fiber web is synthetic fibers.

19. The fiber web of claim 14, wherein the fiber web has a tensile elongation in the cross-machine direction of greater than about 2%.

20. The fiber web of claim 14, wherein the fiber web has a tensile elongation in the cross-machine direction is between about 2% and about 15%.

21. The fiber web of claim 14, wherein the fiber web has a basis weight between 60 g/m$^2$ and about 80 g/m$^2$.

22. The fiber web of claim 14, wherein the fiber web has a permeability of between about 5 cfm/sf and about 200 cfm/sf.

23. A filter element comprising the fiber web of claim 1.

* * * * *